United States Patent
Isakov et al.

(10) Patent No.: US 10,948,991 B2
(45) Date of Patent: Mar. 16, 2021

(54) HAPTIC FEEDBACK FOR VIRTUAL REALITY

(71) Applicant: Valkyrie Industries Limited, Ingatestone (GB)

(72) Inventors: Ivan Isakov, Ingatestone (GB); Kourosh Atefipour, Ingatestone (GB); Oliver Cleveley-Jones, Ingatestone (GB)

(73) Assignee: Valkyrie Industries Limited, Ingatestone (GB)

( * ) Notice: Subject to any disclaimer, the term of this patent is extended or adjusted under 35 U.S.C. 154(b) by 0 days.

(21) Appl. No.: 16/971,111

(22) PCT Filed: Feb. 19, 2019

(86) PCT No.: PCT/GB2019/050439
§ 371 (c)(1),
(2) Date: Aug. 19, 2020

(87) PCT Pub. No.: WO2019/158949
PCT Pub. Date: Aug. 22, 2019

(65) Prior Publication Data
US 2021/0004087 A1  Jan. 7, 2021

(30) Foreign Application Priority Data
Feb. 19, 2018  (GB) ..................... 1802645

(51) Int. Cl.
*G06T 19/00* (2011.01)
*G06F 3/01* (2006.01)
(Continued)

(52) U.S. Cl.
CPC ............ *G06F 3/016* (2013.01); *A63F 13/211* (2014.09); *A63F 13/285* (2014.09); *G06F 3/014* (2013.01);
(Continued)

(58) Field of Classification Search
CPC .............................. G06T 7/0002; G06F 3/016
(Continued)

(56) References Cited

U.S. PATENT DOCUMENTS

2011/0279249 A1  11/2011  Kipman et al.
2013/0244211 A1*  9/2013  Dowling ............. G06F 19/3481
434/247
(Continued)

FOREIGN PATENT DOCUMENTS

CN  106557155 A  4/2017
CN  106569603 A  4/2017
(Continued)

OTHER PUBLICATIONS

International Search Report and Written Opinion dated Jul. 9, 2019 for International Patent Application No. PCT/GB2019/050439, 21 pages.
(Continued)

*Primary Examiner* — Thomas J Lett
(74) *Attorney, Agent, or Firm* — Luedeka Neely Group, P.C.

(57) ABSTRACT

The present invention relates to virtual reality systems that provide haptic feedback to users. In particular, the following describes a system that may provide a user with an indication of a force exerted by a virtual object and/or a texture of a virtual object. A virtual reality system is arranged to provide haptic feedback to a user, comprising: a controller; determination means for producing output data representative of an orientation and/or velocity and/or acceleration of an upper arm of the user and an orientation and/or velocity and/or acceleration of a lower arm of the user, the determination means in communication with the controller for providing output data to the controller; and a set of electrodes for attachment to a limb of a human body, each (Continued)

electrode in communication with the controller for receiving an stimulation signal from the controller for applying an electrical stimulus based on the stimulation signal to the muscle of a user. The controller is arranged to define a virtual environment; receive output data from the determination means to determine a first orientation of an upper arm of the user and a second orientation of a lower arm of the user; represent a virtual hand of the user in the virtual environment; represent a virtual object with a predefined mass in the virtual environment; and generate stimulation signals to simulate a force applied to the virtual hand by the virtual object, and wherein the controller is arranged to generate the stimulation signals such that the simulated force is determined based on the first and second orientations.

17 Claims, 6 Drawing Sheets

(51) Int. Cl.
G06K 9/00 (2006.01)
G06N 20/00 (2019.01)
A63F 13/211 (2014.01)
A63F 13/285 (2014.01)

(52) U.S. Cl.
CPC ......... *G06F 3/015* (2013.01); *G06K 9/00375* (2013.01); *G06N 20/00* (2019.01); *G06T 19/00* (2013.01)

(58) Field of Classification Search
USPC ......................................................... 345/419
See application file for complete search history.

(56) References Cited

U.S. PATENT DOCUMENTS

2014/0278220 A1* 9/2014 Yuen ................ A61B 5/02416
702/150
2018/0081439 A1 3/2018 Daniels

FOREIGN PATENT DOCUMENTS

DE 102014226798 A1 6/2016
EP 2846222 A1 11/2015
WO 2006022307 A1 3/2006
WO 2016168117 A2 10/2016

OTHER PUBLICATIONS

Combined Search and Examination Report dated Aug. 20, 2018, for GB Patent Application No. GB1802645.0, 7 pages.

* cited by examiner

HAPTIC FEEDBACK FOR VIRTUAL REALITY

CROSS REFERENCE TO RELATED APPLICATIONS

This application is a U.S. National Phase of International Application No. PCT/GB2019/050439 filed on Feb. 19, 2019, which claims the benefit of GB Patent Application No. 1802645.0 filed Feb. 19, 2018, each of which is incorporated by reference herein in its entirety.

The present invention relates to virtual reality systems that provide haptic feedback to users. In particular, the following describes a system that may provide a user with an indication of a force exerted by a virtual object and/or a texture of a virtual object.

It is known in the art to provide a vibratory signal to provide an indication of texture.

It is also known to provide force feedback via apparatus manipulated by a user when using a virtual reality system.

There remains a need in the art to provide a more accurate representation of textures and forces applied by virtual objects and one that is not dependent upon the use of apparatus held by the user.

According to the present invention, there is provided a system and method as defined by the following claims.

The system is arranged to provide haptic feedback to a user. The haptic feedback may be in the form of an electrical stimulus applied by a set of electrodes to the muscle(s) of the user. In this way a virtual object having a simulated weight can be "felt" in the user's hand even though no load is actually placed on the user's hand.

The system may generate the electrical stimulus in such a way that the simulated force takes into consideration the position of the limb to which the force is being applied. This is advantageous because the activation of the user's muscles to resist a load will depend on the orientation of the limb.

Similarly, the system may take into consideration limb orientation when simulating a texture.

According to the invention, there is provided systems and methods as defined in the claims.

According to a first aspect of the invention, a virtual reality system arranged to provide haptic feedback to a user, comprises: a controller; determination means for producing output data representative of an orientation and/or velocity and/or acceleration of an upper arm of the user and an orientation and/or velocity and/or acceleration of a lower arm of the user, the determination means in communication with the controller for providing output data to the controller; and a set of electrodes for attachment to a limb of a human body, each electrode in communication with the controller for receiving an stimulation signal from the controller for applying an electrical stimulus based on the stimulation signal to the muscle of a user.

The controller is arranged to: define a virtual environment; receive output data from the determination means to determine a first orientation of an upper arm of the user and a second orientation of a lower arm of the user; represent a virtual hand of the user in the virtual environment; represent a virtual object with a predefined mass in the virtual environment; and generate stimulation signals to simulate a force applied to the virtual hand by the virtual object, and wherein the controller is arranged to generate the stimulation signals based on the first and second orientations.

According to a second aspect of the invention, a virtual reality system arranged to provide haptic feedback to a user, comprising: a controller; and a set of electrodes for attachment to a limb of a human body, each electrode in communication with the controller for receiving an stimulation signal from the controller for applying an electrical stimulus based on the stimulation signal to the muscle of a user, wherein the set of electrodes comprises: at least one forearm electrode for attachment to a user's forearm; at least one upper arm electrode for attachment to a user's upper arm; and at least one palm electrode for attachment to a user's palm.

The controller is arranged to: define a virtual environment; represent a virtual hand of the user in the virtual environment; represent a virtual object with a predefined mass in the virtual environment; generate an upper arm stimulation signal to simulate a force applied to the virtual hand by the virtual object using the upper arm electrode; generate a forearm stimulation signal to simulate a force applied to the virtual hand by the virtual object using the forearm electrode; and generate a skin stimulation signal to simulate a force applied to the virtual hand by the virtual object using the palm electrode, and wherein the skin stimulation signal differs from the upper arm and forearm stimulation signals in respect of frequency and amplitude. The skin stimulation signal and upper arm and forearm stimulation signals may be generated as in the first or third aspects.

According to a third aspect of the invention, a method for providing haptic feedback to a user, the method comprising the steps of: defining a virtual environment with a controller; representing a virtual object with a predefined mass in the virtual environment with the controller; producing output data representative of an orientation and/or velocity and/or acceleration of an upper arm of the user and an orientation and/or velocity and/or acceleration of a lower arm of the user using determination means and thereby providing output data to the controller; determining with the controller a first orientation of an upper arm of the user and a second orientation of a lower arm of the user; representing a virtual hand of the user in the virtual environment using the defined first and second orientations; generating stimulation signals with the controller to simulate a force applied to the virtual hand by the virtual object, wherein the controller is arranged to generate the stimulation signals based on the first and second orientations; and applying an electrical stimulus based on the stimulation signal to the muscle of a user based on a stimulation signal from the controller.

According to a fourth aspect of the invention a virtual reality system arranged to provide haptic feedback to a user, comprising the steps of: defining a virtual environment; representing a virtual hand of the user in the virtual environment; representing a virtual object with a predefined mass in the virtual environment; generating a skin stimulation signal to simulate a force applied to the virtual hand by the virtual object; and applying an electrical stimulus based on the stimulation signal to the muscle of a user. The skin stimulation signal may be generated as in the first or third aspects.

For a better understanding of the invention and to show how the same may be put into effect, reference will now be made, by way of example only, to the accompanying drawings in which.

As is known in the art, a virtual reality system will comprise at least a head-mounted device 5 comprising a display. The head-mounted device 5 includes sensors that will sense the position and orientation of the user's head. The position of items in the virtual environment can be defined relative to this.

Figure 3:
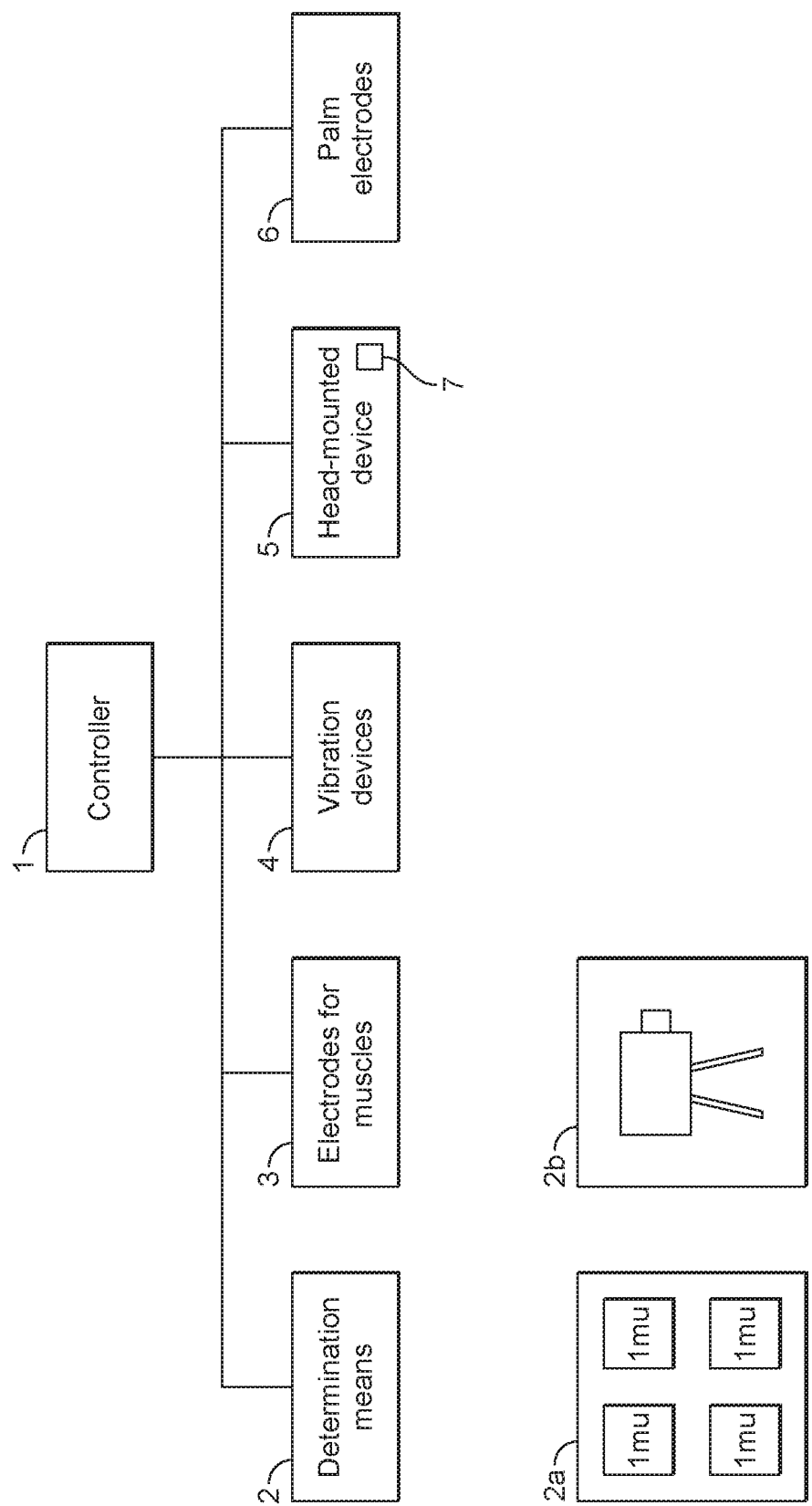
FIG. 3 shows a schematic representation of a system in accordance with the invention for carrying out the disclosed methods.

As can be seen from the schematic representation of FIG. 3, a virtual reality system in accordance with the invention also comprises: a controller 1; determination means 2 for producing output data representative of an orientation of a user's limb(s); and a set of electrodes 3 for attachment to the limb. Optionally, tactile devices 4 may also be provided (these are discussed below).

The determination means 2 and each of the electrodes 3 are in communication with the controller 1.

Each electrode 3 is arranged to receive a stimulation signal from the controller 1 for applying an electrical stimulus to the muscle of the user based on a stimulation signal. The electrical stimulus is configured to stimulate the muscle to contract with a predetermined tension.

The electrodes 3 may be provided with a common ground electrode. However, it is preferred that the electrodes 3 are provided in pairs to avoid cross-talk (i.e. the superimposition of one signal upon another). When provided in pairs, the stimulation signal may be applied to one electrode 3 of each pair, with the other electrode of the pair acting as ground.

As will be described below, the controller 1 thus generates stimulation signals to simulate a force applied to the hand of the user.

The determination means 2 produces output data representative of an orientation and/or velocity and/or acceleration of an upper arm of the user and an orientation and/or velocity and/or acceleration of a lower arm of the user. The determination means 2 provides the output data to the controller 1.

The controller 1 receives the output data from the determination means 2 and uses that output data to estimate a first orientation of an upper arm of the user and a second orientation of a lower arm of the user. Preferably, the determination means 2 also estimates a third orientation of the hand of the user and, optionally, a fourth orientation of the user's body (for example, this may be an estimate of the orientation of a line extending between the positions of the user's shoulders).

In one preferred embodiment, the determination means 2a comprises a set of sensor units for attachment to an arm of a human body, each sensor unit being arranged to produce output data representative of an orientation and/or acceleration of the sensor unit, each sensor unit being in communication with the controller 1 for providing sensor data to the controller 1.

For example, the set of sensor units may comprise a plurality of three-dimensional compasses, which output data representative of orientations. For at least one arm of the user (and preferably for each arm) there is provided a three-dimensional compass for each of the upper arm and lower arm and, preferably, also for the hand and/or shoulder.

Alternatively, or in addition, the set of sensor units may comprise a plurality of accelerometers or inertial measurement units. For at least one arm of the user (and preferably for each arm) there is provided an inertial measurement unit for each of the upper arm and lower arm and, preferably, also for the hand and/or shoulder. Each inertial measurement unit is arranged to output data representative of a measured orientation. Most preferably, for at least one arm of the user (and preferably for each arm) one or more inertial measurement units is provided for the upper arm and one or more inertial measurement units is provided for the lower arm. Preferably, one or more inertial measurement units may be provided for the shoulder. Optionally, one or more inertial measurement units may be provided for the hand (as discussed further below).

Optionally, finger orientations may be monitored in the same way, using an inertial measurement unit on each monitored finger.

Using the measured accelerations, it is possible to estimate the orientations of the upper and lower arms (for one or both arms) and, optionally, also the hand and/or shoulder.

Ideally, the accelerometers or inertial measurement units would be wearable or otherwise securable to the body of a user.

From the orientations of the upper and lower arms (and, optionally, also the hand and/or shoulder), it is possible to derive estimates for the positions of the joints of the arm, the extension of the arm relative to the body, etc.

Figure 2:
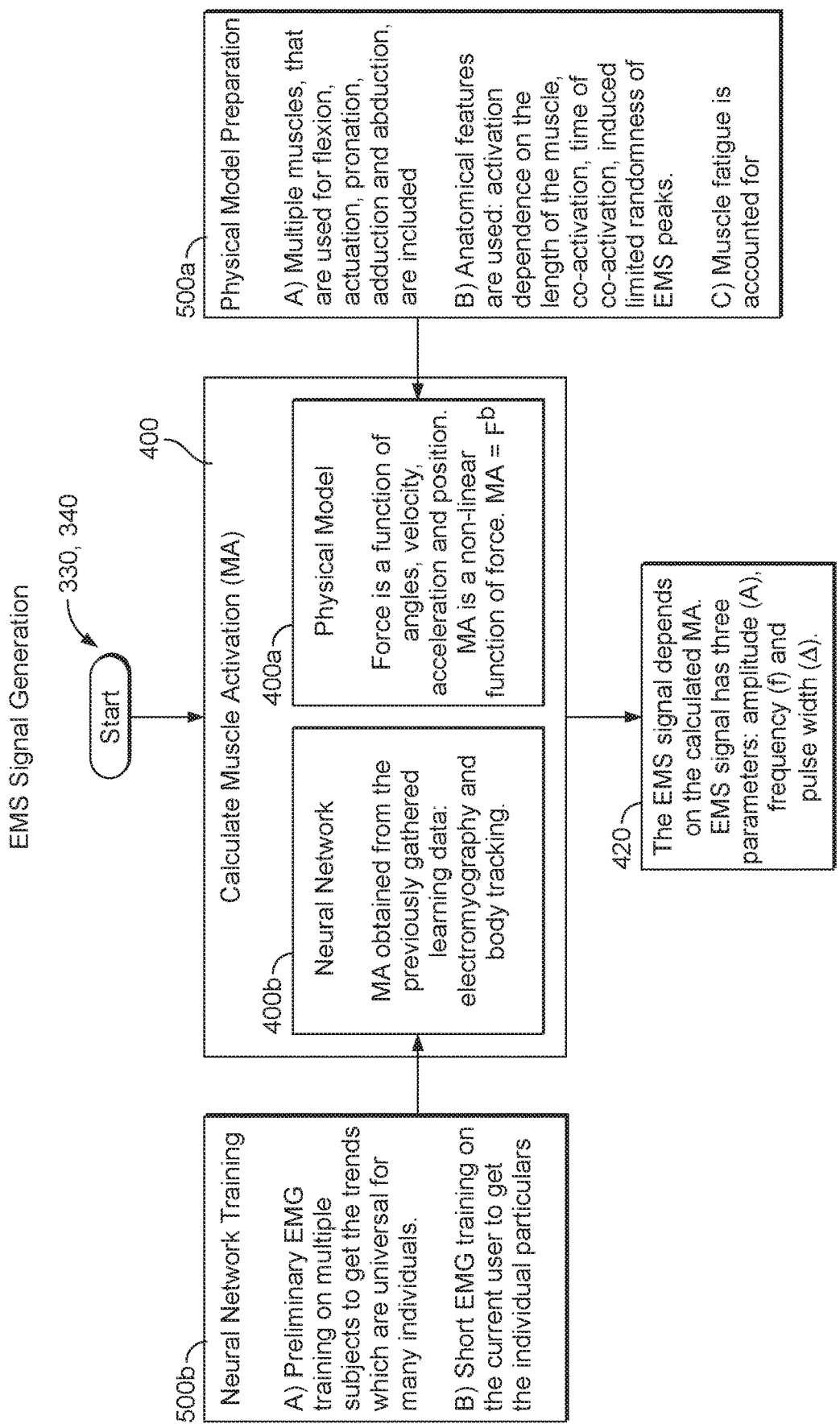
FIG. 2 shows an embodiment of a method of generating a stimulation signal in accordance with the invention.

In an alternative preferred embodiment, or as a supplementary feature, the determination means 2b comprises a video camera (visible light and/or infrared) in communication with the controller 1 for providing video data to the controller 1. The use of this is shown in step 205 of FIG. 2.

The controller 1 is arranged to receive video data from the video camera and apply a pose recognition algorithm and/or pose tracking algorithm for one or both arms to estimate a first orientation of an upper arm of the user and a second orientation of a lower arm of the user.

Optionally, the determination means 2 also estimates a third orientation of the hand of the user and, optionally, a fourth orientation of the user's body.

In some embodiments both types of determination means 2a, 2b may be provided. The estimated first and second orientations outputted by each determination means 2a, 2b may be fused/combined (for example, by averaging the orientations derived by each determination means 2a, 2b).

The head-mounted device 5 may also include a camera 7. The camera 7 can be directed forwardly and generally downwardly, and may have a broad angle of view. The camera may be a visible light camera or an infrared camera.

In any embodiment, the virtual reality system may include a glove for one or each hand, wherein the glove includes sensors for sensing the flexion/extension of the fingers. For example, there may be a strain gauge arranged to extend along the back (opposite the palm side) of each finger.

In preferred embodiments, the haptic feedback may include texture and/or touch feedback, in which case the virtual reality system will also comprise one or more tactile devices 4, each for attachment to a finger. The tactile devices 4 may be arranged to provide a vibration and/or apply a constant pressure in accordance with a touch signal. Thus, the touch signal for each tactile device 4 can characterise a contact force between a virtual fingertip and a virtual object and/or a texture that would be felt by a virtual fingertip moving across a virtual object.

Each tactile device 4 is arranged to be worn on a hand or finger whereby vibration may be transmitted to the tip of a finger. For example, one or two gloves may be provided with a tactile device 4 attached to the tips of each finger of the glove.

For tactile devices 4, any vibrotactile devices could be used, such as eccentric rotating motors, linear resonant actuators, voice-coils, piezoelectric actuators or solenoids.

Preferably, the tactile devices 4 may be piezoelectric devices or, more preferably, solenoids (e.g., push-pull type solenoids). Solenoids are preferred, since these can provide a constant force, more intense vibrations at lower frequencies, and wide frequency band vibrations.

The tactile devices 4 are arranged to receive a touch signal from the controller 1.

Figure 4:
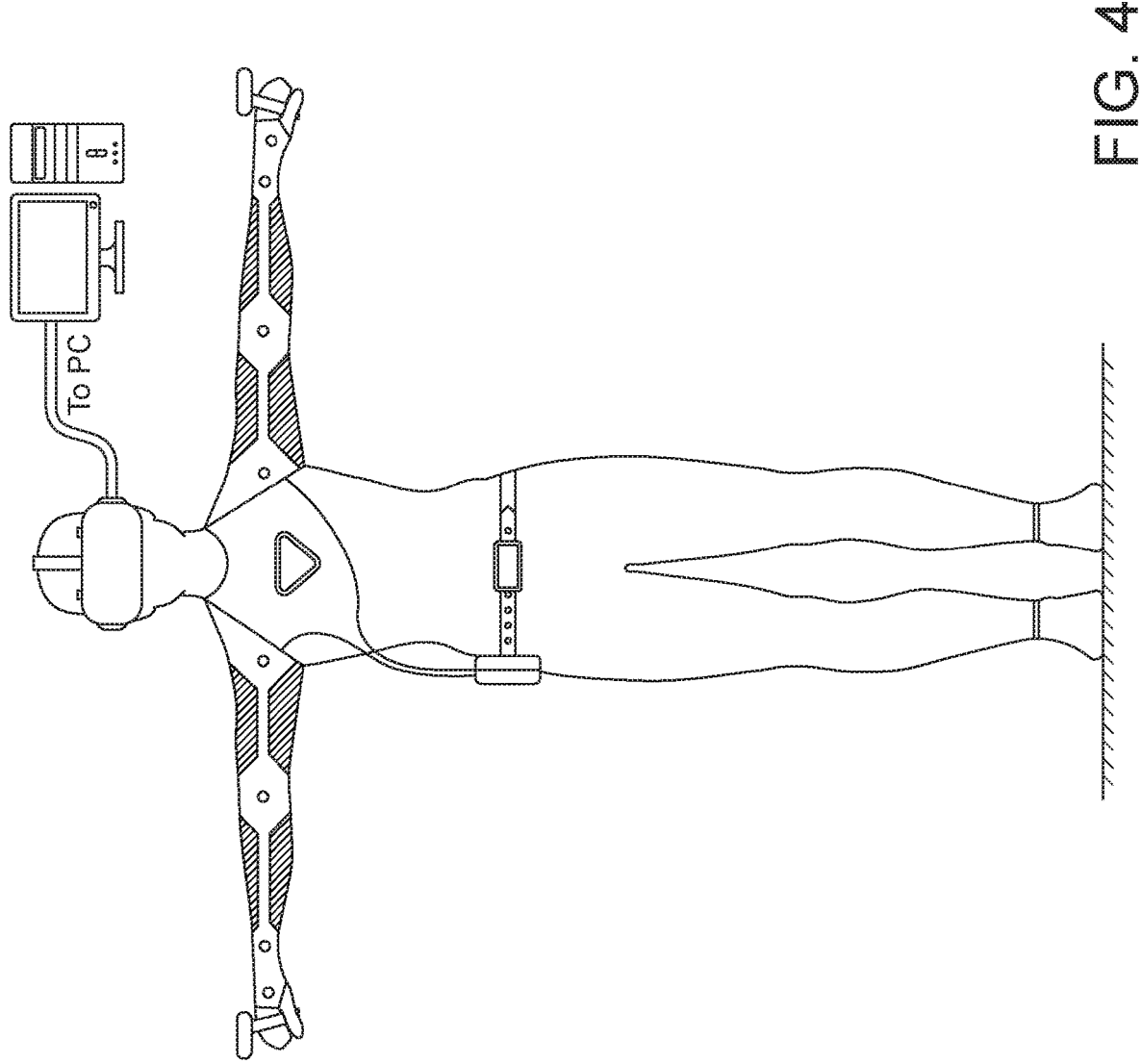
FIGS. 4 and 5 show an embodiment of a system in accordance with the invention for carrying out the disclosed methods.

In preferred embodiments, the electrodes 3 are incorporated into a garment, as can be seen in FIG. 4. Similarly, when determination means 2a is used, this can also be incorporated into the garment.

The controller 1 may be arranged to carry out one or all of the methods set out below.

The following describes a method of simulating a force as applied to a single arm of a user. Preferably, however, this is done for both arms. It is also envisaged that this can be done for one or both legs (where mention of the upper arm corresponds to the upper leg and mention of the lower arm corresponds to the lower leg), for example, in order to simulate environments with different gravity or, perhaps, underwater environments.

Figure 1:
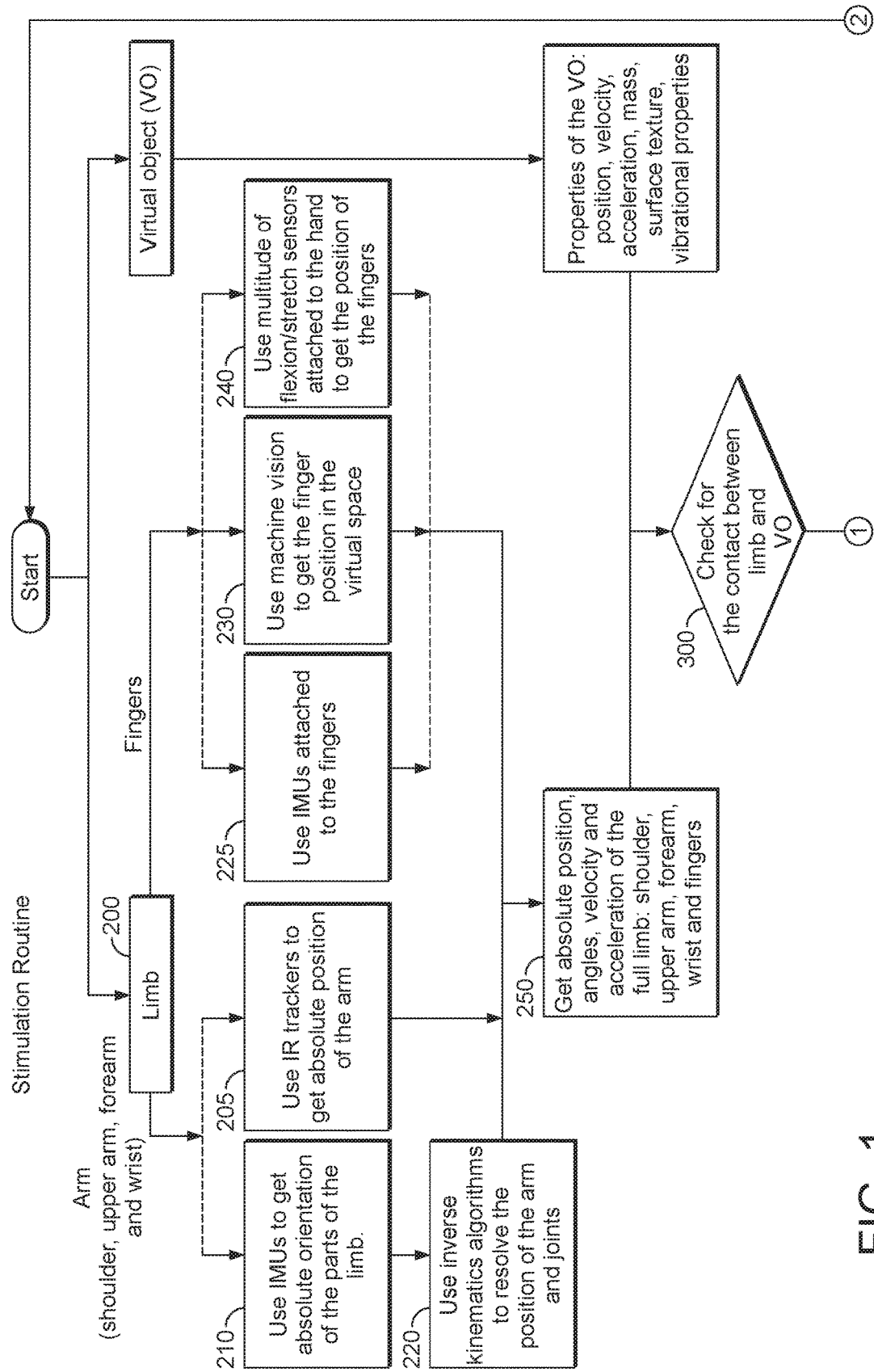
FIG. 1 shows an embodiment of a stimulation method in accordance with the invention.
Figure 1:
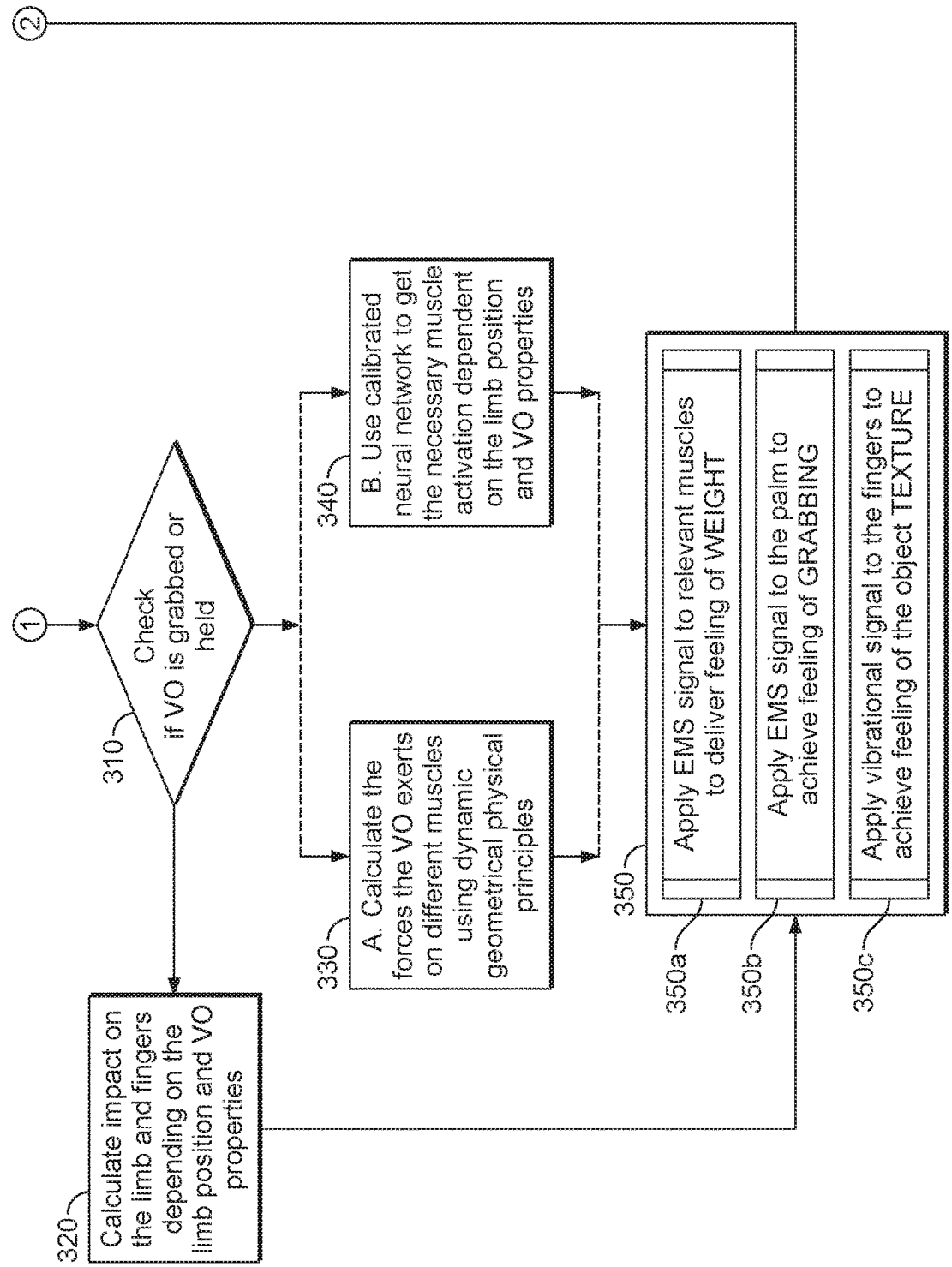

As can be seen in FIG. 1, an embodiment of a method of simulating a force comprises: defining a virtual object in a virtual environment 100; generating a virtual arm 200 for representing a corresponding arm of the user; identifying when the virtual arm and the virtual object contact 300; calculating the force that would be applied by such an object to such an arm by such contact 330, 340; and generating stimulation signals 350 based on the orientations of the virtual arm.

The step of defining a virtual object in a virtual environment 100 may comprise storing virtual object data 150 representative of a mass and position of an object in a virtual environment. The virtual object data may also comprise texture data, defining a texture on the surface of the object (for example, a two-dimensional array denoting height of protrusions from the surface). Optionally, the virtual object data may also comprise one or more of: velocity; acceleration; and/or vibrational properties. Vibrational properties of the object may represent how the object will react to contact. These may include one or more of: the intensity of the pressure, intensity and/or frequency of vibrations, frequency spectrum of the vibrations, dependence of the vibrational intensity/frequency on the finger penetration into the object, or on the finger movement along the object.

The step of generating a virtual arm 200 may involve generating a two-part virtual arm including the upper arm and lower arm, or generating a three or four part virtual arm including the upper arm and lower arm and the shoulder and/or hand.

The step of generating a virtual arm 200 may comprise storing arm data representative of the lengths of the upper arm and lower arm of the user (this is discussed further below). Optionally, the distance between the shoulders and/or the size of the hands is also stored.

In addition, the step of generating a virtual arm 200 may also comprise in step 210 the controller 1 obtaining output data representative of the orientation of the user's upper arm and lower arm from the determination means 2, and thereby determining a first orientation of an upper arm of the user and a second orientation of a lower arm of the user.

Optionally, step 210 may also include the controller 1 receiving sensor data from one or more of the sensor units of the determination means 2 to determine a first velocity and/or acceleration of an upper arm of the user and a second velocity and/or acceleration of a lower arm of the user, and thereby determining a first velocity and/or acceleration of an upper arm of the user and a second velocity and/or acceleration of a lower arm of the user.

In step 220, from the first and second orientations, the positions and extensions of the joints of the user's arm (shoulder, elbow, wrist) can be estimated (e.g., relative to the head-mounted device) using the arm data. Thus, the position of a hand of the user can be determined.

Instead of steps 210 and 220, or in combination therewith, step 205 can utilise a video camera (preferably an infrared camera) for applying a pose recognition algorithm and/or pose tracking algorithm to estimate a first velocity and/or acceleration of an upper arm of the user and a second velocity and/or acceleration of a lower arm of the user, and thereby determining a first velocity and/or acceleration of an upper arm of the user and a second velocity and/or acceleration of a lower arm of the user.

Optionally, the position of the fingers of the user's hand can be determined as discussed below with respect to optional steps 225, 230, 240.

Moreover, in preferred embodiments, the first and second derivatives of any of these quantities may be estimated (that is, the arm segment velocities and accelerations, and the angular velocities and accelerations about the joints).

Step 220 may be carried out using the well-known technique of inverse kinematics.

In step 250, the positions and angles in the virtual environment of the virtual arm are set so as to match the corresponding quantities of the user's arm in the real world as derived using the determination means 2. When one or both of optional steps 230 and 240 is/are provided, these will be fused/combined with the result of step 220 in step 250.

Whereas steps 200 to 250 are described with respect to a two part virtual arm including the upper arm and lower arm only, the shoulder and/or hand may also be included in the virtual arm.

In step 300, it is established whether there is contact between the virtual arm and virtual object.

Steps 330 and 340 are alternative methods for calculating an appropriate stimulation signal for applying an electrical stimulus to the muscle of the user using the electrodes 3. These are set out in detail below.

The outputs of steps 330 and 340 may be the parameters of the stimulation signal. For example, the parameters may include one or more of: amplitude (power, voltage or current); frequency; pulse shape (e.g., triangular, square, sinusoidal), pulse polarity, and/or pulse width modulation parameters (e.g., duty cycle).

Steps 330 and 340 may be alternative methods, or may be used in combination (the outputs could be fused/combined, for example, by averaging).

In step 350, the controller 1 outputs the stimulation signal so as to apply a stimulus to the user.

Specifically, step 350 may comprise the controller 1 outputting 350a the stimulation signal so as to apply an electrical stimulus to the arm muscles of the user using the electrodes 3.

Step 350 may comprise the controller 1 outputting 350b the stimulation signal so as to apply an electrical stimulus to the palm of the user to simulate contact using the electrodes 3.

Step 350 may comprise the controller 1 outputting 350c a touch signal so as to apply a vibrational signal and/or pressure to one or more of the fingers of the user using the tactile devices 4.

Accordingly, the embodiment can be used to simulate loads applied to the larger muscles of the user's arm, e.g. the biceps, triceps and the muscles of the lower arm used to flex or extend the digits of the user's hand.

It is possible to provide an inertial measurement unit for each finger (on each arm if both are to be monitored). This is represented by step 225 in FIG. 1.

However, in preferred embodiments, the positions of the fingers may be estimated in a different way from the positions of the upper and lower arm.

Figure 5:
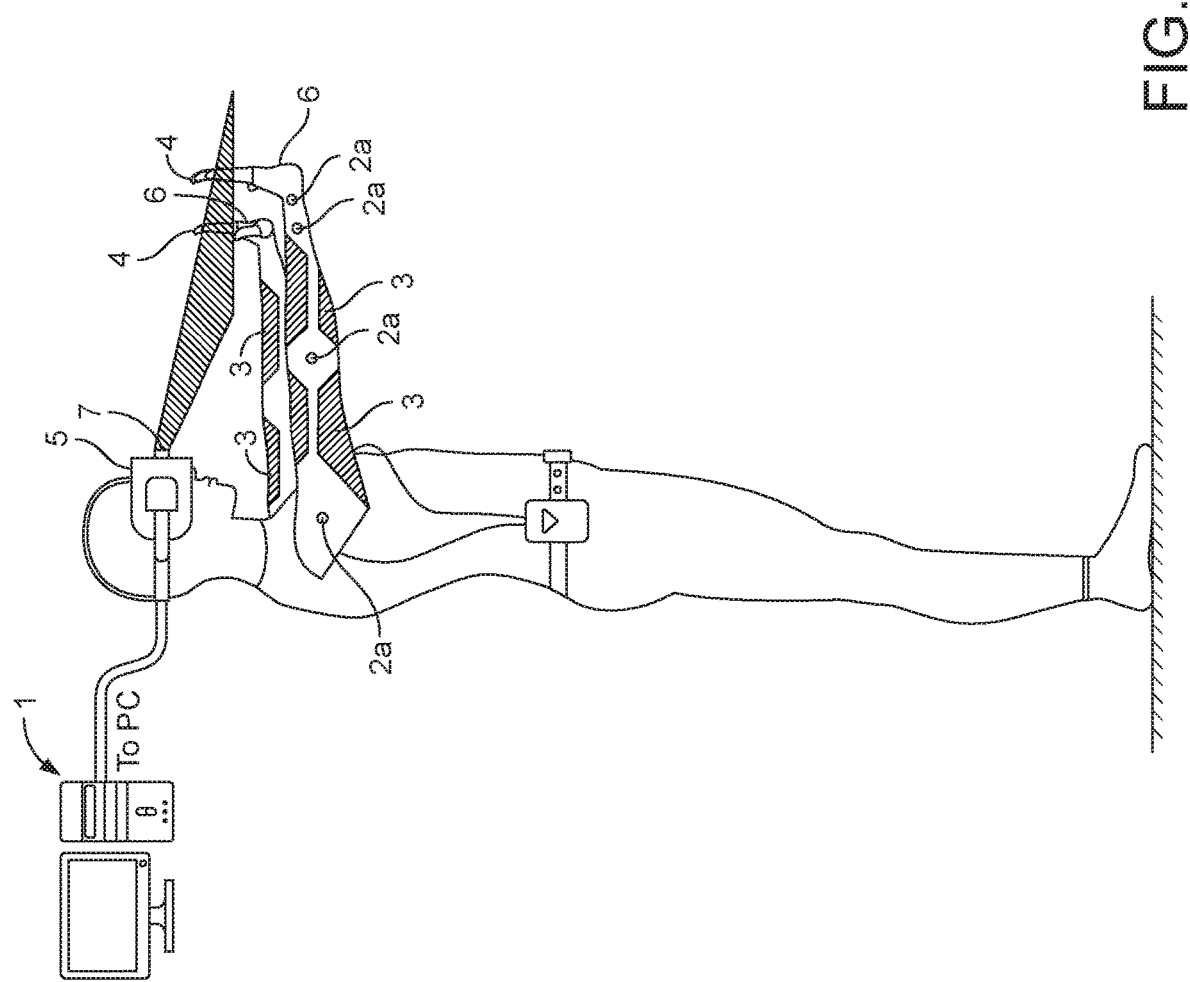

The virtual reality system may include a camera. For example, as shown in FIG. 5, the head-mounted device 5 may include a camera. The camera can be directed forwardly and generally downwardly, and may have a broad angle of view. The camera may be a visible light camera or an infrared camera.

In step 230, the camera captures an image of the user's hands and applies known machine vision and tracking algorithms to estimate the location of the fingers by processing one or more images captured by the camera. The finger location data is passed to the controller 1.

Alternatively, the virtual reality system may include a glove for one or each hand, wherein the glove includes finger position sensors for sensing the flexion/extension of the fingers. For example, there may be a strain gauge arranged to extend along the back (opposite the palm side) of each finger.

In step 240, the controller 1 estimates the location of the fingers using the signals received from the finger position sensors.

Steps 230 and 240 may be alternative methods, or may be used in combination (the finger positions could be fused/combined, for example by averaging).

Optionally, in step 310, it is established whether the contact between the virtual arm and virtual object is such the virtual hand is grasping the virtual object. For example, such a determination could be made simply by identifying whether there is contact (as determined in step 300) and whether the fingers of the hand form a grasping shape (as determined in step 230 and/or 240).

If the virtual object is grasped, then step 320 is carried out (in addition to step 330 and/or 340).

In step 320, the controller 1 calculates an appropriate stimulation signal for applying an electrical stimulus to the muscles of the user's forearm using the electrodes 3. The stimulation signal may be generated as a function of the angle of the adjacent elbow joint (for example, the amplitude of the stimulation signal may be a function of the angle of the adjacent elbow joint—the angle between the upper arm and lower arm). Additionally, or alternatively, the stimulation signal may be calculated based on the angles of the fingers and the hand of the user so that a realistic load can be simulated that takes into consideration the geometrical configuration of the user's hand.

Optionally, as described below, the user's palm may also be stimulated by an electrode 3. As discussed below, a different stimulation signal would be appropriate for the palm.

Step 350 may comprise the controller 1 outputting 350a the stimulation signal so as to apply an electrical stimulus to the arm muscles of the user using the electrodes 3.

In such embodiments, step 350 may also comprise the controller 1 outputting 350b the stimulation signal so as to apply an electrical stimulus to the palm of the user to simulate contact using the electrodes 3.

In embodiments in which the virtual object data comprises texture data, defining a texture on the surface of the object, and the virtual reality system includes tactile devices 4, step 350 may also comprise the controller 1 outputting 350c a touch signal so as to apply a vibrational signal and pressure to one or more of the fingers of the user using the tactile devices 4. The touch signal may encode both frequency and amplitude of the intended vibration.

For example, when one or more of the fingers of the user is/are determined to contact the object, a touch signal may be generated based on the texture of the object at the point of contact. The relative motion of the fingers and object may be used in the generation of the touch signal, for example to determine the frequency of vibration or the pressure level. Advantageously, the amplitude of the vibration may be determined based (at least in part) on the force that would be applied to the virtual hand by the virtual object. The force may be determined based on the mass of the object and the orientation of the virtual hand. Therefore, the controller 1 may be arranged to generate the touch signals based on the first and second orientations.

In embodiments in which the first and second derivatives of the arm locations and orientations are estimated (e.g., the arm segment velocities and accelerations, and the angular velocities and accelerations about the joints), this may be used in combination with the position, velocity, acceleration and mass parameters for the virtual object to determine the force. Therefore, the controller 1 may be arranged to generate the touch signals based on the first and second orientations and/or on the first and second velocities and/or accelerations.

The two steps 330, 340 alternatively, or in combination, calculate an appropriate stimulation signal. They are shown in parallel in FIG. 2, in which they differ in that step 330 includes option 400a and step 340 includes option 400b. The outputs of the two steps 400a, 400b may be fused/combined by combining the two alternative proposed muscle activations (for example, by averaging).

Step 330 utilises a physical model of the arm, which includes the positions and angles of the upper arm and lower arm and, optionally, also including the hand and/or shoulder orientations. Step 330 calculates an appropriate muscle activation to apply with each electrode 3 to simulate the force that would be applied by a given load (e.g., the weight of the virtual object).

The physical model includes parameters that represent the following:

Muscle type for each muscle to be stimulated.
Locations of muscles to be stimulated (e.g. the joints about which they act).
Lengths of muscles to be stimulated (a contracted muscle requires a different stimulation from an extended muscle). This can be estimated from joint angle.
The corresponding agonist/antagonist for each muscle (the muscle that acts in the opposite sense, e.g. biceps vs. triceps). It is normal for the muscles to be activated in pairs to stabilise the joints about which they act,
Time of co-activation. An agonist may be triggered following a predetermined delay.
Randomness. Muscle stimulation may be deactivated for short periods (e.g., for less than 100 ms). This can make the system feel less artificial and simulate fatigue.
Fatigue. This may be modelled by adjusting the stimulation frequency and amplitude of the muscles (e.g., reducing the frequency and amplitude after certain prolonged high levels of activation of muscles).

Applying the estimated upper and lower arm orientations (and, optionally, the hand and/or shoulder orientations) and virtual object mass to the physical model, either considering the instantaneous/static forces or, optionally, supplemented the model with velocities and accelerations of the upper arm, lower arm and virtual object, it is possible to calculate the forces that each muscle would be subjected to by such an object in the real world.

In this way, in step 400a, a muscle activation to be applied by each electrode 3 to a corresponding muscle is then calculated using the physical model and the estimated upper and lower arm orientations and virtual object mass.

Subsequently, in step 420, the parameters for a stimulation signal for each electrode 3 is calculated to achieve the particular muscle activations. The outputs of steps 330 and 340 may be the parameters of the stimulation signal. The parameters may include one or more of: amplitude (voltage and/or current); frequency; and/or pulse width modulation parameters (e.g. duty cycle). Preferably, the parameters are calculated differently for different muscles (e.g. the same force to be applied by two different muscles will lead to a different stimulation signal). This can provide a more realistic simulation of force.

Step 340 utilises a prediction algorithm trained to predict an appropriate muscle activation from the orientations estimated and from the mass of the virtual object.

The inventors have realised that data suitable for modelling muscle activation may be estimated directly from arm position and object mass using a prediction algorithm (such as an artificial neural network) trained using the natural activation of arm muscles. Preferably, this may be measured using the electrodes 3 that are used for muscle stimulation (alternatively, but less preferably, different electrodes may be provided). In other words, the electrodes 3 can therefore be used to provide electromyography data and the orientations of the upper and lower arms and the mass held in the user's hand can be mapped on to the electromyography data using the prediction algorithm.

As a specific example, a prediction algorithm, such as a neural network, for each muscle may be trained (for example, using back propagation) with training data comprising a plurality of input vectors formed by a concatenation of the orientations (and, optionally, velocity and acceleration data) of the upper and lower arms and a value for a mass held in the user's hand (a variety of masses and orientations would be used) and target data corresponding to measured muscle activations.

In preferred embodiments, the measured muscle activations used to generate the target data may be characterised by the same parameters (or a subset thereof) that define the stimulation signal. Preferably, at least the amplitude and frequency are included in the target data. Optionally, the target data can include time variables for modelling co-activation and fatigue.

The prediction algorithm, once trained, may be presented with an input vector, a concatenation of the orientations (and, optionally, velocity and acceleration data), and output a prediction of the corresponding data characterising the muscle activation (frequency and amplitude and, optionally, time variables). The output data can be used to generate the electrical stimulation signal.

Other parameters that may be used to characterise the stimulation, such as pulse width modulation, may be provided using a different method (for example, look-up tables). As in other embodiments, the hand and/or shoulder orientations (and, optionally, velocity and acceleration data) and measured muscle activations may be considered.

Therefore, in contrast to the analytical approach of step 400a, step 400b utilises the electromyography data as an input to a prediction algorithm to map directly to the required muscle activation.

Steps 330 and 340 may be alternative methods, or may be used in combination (the outputs could be fused/combined, for example by averaging).

Whereas in the description given above, each muscle electrode 3 is arranged to receive a muscle stimulation signal from the controller 1 to stimulate a muscle to contract, the inventors have realised that electrodes can also apply a stimulus to the skin to provide a sensation of pressure. Therefore, it is preferable to also provide a palm electrode 6 for one or each palm for applying an electrical stimulus to the skin of the hand of the user based on a skin stimulation signal. The skin stimulation signal is configured to stimulate the skin to provide a feeling of contact.

In order that the skin is stimulated without stimulating the underlying muscle, the power and/or voltage and/or current applied by the palm electrode 6 will be below that of the power and/or voltage and/or current applied by the muscle electrodes 3.

There is therefore a preferred, but optional, step 350b of generating a skin stimulation signal to simulate a force applied to the virtual hand by the virtual object using the palm electrode.

The skin stimulation signal can be varied depending on the contact force between the object and the palm of the hand, and so can utilise the methods and apparatus described above.

An embodiment of such a virtual reality system comprises for one or both arms of a user at least two palm electrodes 6 for attachment to a user's palm. Preferably, the electrodes are positioned on either side of the user's palm (for example, over the thenar and hypothenar muscles). In addition to the functions given in any of the embodiments set out above, the controller 1 is arranged to generate a skin stimulation signal to simulate a force applied to the virtual hand by the virtual object using the palm electrode.

The skin stimulation signal differs from the upper arm and forearm stimulation signals in respect of amplitude and, optionally, pulse width and frequency.

A preferred embodiment of a virtual reality system would comprise for one or both arms of a user: at least one, preferably two, forearm electrode(s) 3 for attachment to a user's forearm; at least one, preferably two, upper arm electrode(s) 3 for attachment to a user's upper arm; and at least one palm electrode pair 6 for attachment to a user's palm. The controller 1 would be arranged to: generate an upper arm stimulation signal to simulate a force applied to the virtual hand by the virtual object using the upper arm electrode; generate a forearm stimulation signal to simulate a force applied to the virtual hand by the virtual object using the forearm electrode; and generate a palm stimulation signal to simulate a force applied to the virtual hand by the virtual object using the palm electrode.

In some embodiments, more than two palm electrodes are provided. For example, a plurality of palm electrodes 6 may be spaced around the perimeter of the palm. A pair of palm electrodes 6 may be selected to provide an indication of contact at a particular location (e.g., a point between the selected pair of palm electrodes 6). The pair of palm electrodes 6 may be selected based on the location of contact between the virtual hand and the virtual object.

The step of generating a virtual arm 200 may comprise storing arm data representative of the lengths of the upper arm and lower arm of the user. Optionally, the distance between the shoulders and the size of the hands is also stored.

In some embodiments, this data may be entered manually. However, it is preferable to obtain this data automatically.

In embodiments with a camera 7 incorporated into the head mounted device 5, these measurements may be estimated by instructing the user to extend their arms directly forward. Image recognition algorithms and the stored values of the camera parameters may be used to calculate arm length.

In any of the embodiments set out above, the controller 1 may be a single unit (as shown in FIGS. 4 and 5, or may be a distributed controller 1, having multiple components in multiple locations.

The invention claimed is:

1. A virtual reality system configured to provide haptic feedback to a user, comprising:
   a controller;
   determination means for producing output data representative of an orientation and/or velocity and/or acceleration of an upper arm of the user and an orientation and/or velocity and/or acceleration of a lower arm of the user, the determination means in communication with the controller for providing output data to the controller; and
   a set of electrodes for attachment to a limb of a human body, each electrode in communication with the controller for receiving an stimulation signal from the controller for applying an electrical stimulus based on the stimulation signal to a muscle of a user, wherein the controller is configured to:
   define a virtual environment;
   receive output data from the determination means to determine a first orientation of an upper arm of the user and a second orientation of a lower arm of the user;
   represent a virtual hand of the user in the virtual environment;
   represent a virtual object with a predefined mass in the virtual environment; and
   generate stimulation signals to simulate a force applied to the virtual hand by the virtual object,
   wherein the controller is configured to generate the stimulation signals such that the simulated force is determined based on the first and second orientations,
   wherein the controller has a training mode in which it is configured to:
   receive a plurality of electromyography data from one or more electrodes to generate a plurality of target data points;
   for each target data point, receive training data including data representative of a first orientation of an upper arm of the user, a second orientation of a lower arm of the user, and a mass held by the user; and
   apply a machine learning algorithm to the training and target data to provide a prediction algorithm for predicting muscle activation from the orientation of the upper and lower arms and mass held, and
   wherein the controller has a simulation mode in which the controller is configured to:
   define a virtual environment;
   represent a virtual hand of the user in the virtual environment;
   represent a virtual object with a predefined mass in the virtual environment;
   receive electromyography data from one or more of the electrodes; and
   predict a muscle activation from the orientation of the upper and lower arms and predefined mass using the prediction algorithm; and
   carry out the step of generating stimulation signals to simulate a force applied to the virtual hand, wherein the step comprises generating stimulation signals from the predicted muscle activation.

2. The virtual reality system of claim 1, wherein:
   the determination means is configured to produce output data representative of an orientation, velocity and acceleration of an upper arm of the user and an orientation, velocity and acceleration of a lower arm of the user;
   the controller is configured to receive output data from the determination means to determine a first orientation, a first velocity and a first acceleration of an upper arm of the user and a second orientation, a second velocity and a second acceleration of a lower arm of the user;
   the controller is configured to generate the stimulation signals based on the first and second orientations, the first and second velocities and the first and second accelerations.

3. The virtual reality system of claim 1, wherein:
   the determination means comprises a set of sensor units for attachment to an arm of a human body, each sensor unit configured to produce output data representative of an orientation and/or acceleration of the sensor unit, each sensor in communication with the controller for providing sensor data to the controller; and
   the controller is configured to receive sensor data from one or more of the sensor units to determine a first orientation of an upper arm of the user and a second orientation of a lower arm of the user.

4. The virtual reality system of claim 1, wherein:
   the determination means comprises a video camera in communication with the controller for providing video data to the controller; and
   the controller is configured to receive video data from the video camera and apply a pose recognition algorithm to determine a first orientation of an upper arm of the user and a second orientation of a lower arm of the user.

5. The virtual reality system of claim 1, wherein:
   the determination means comprises a video camera in communication with the controller for providing video data to the controller;
   the determination means further comprises a set of sensor units for attachment to an arm of a human body, each sensor unit configured to produce output data representative of an orientation and/or acceleration of the sensor unit, each sensor in communication with the controller for providing sensor data to the controller;
   the controller is configured to receive sensor data from one or more of the sensor units to determine a first nominal orientation of an upper arm of the user and a second nominal orientation of a lower arm of the user;
   the controller is configured to receive video data from the video camera and apply a pose recognition algorithm to determine a third nominal orientation of an upper arm of the user and a fourth nominal orientation of a lower arm of the user; and
   the controller is configured to determine a first orientation of an upper arm using the first and third nominal orientations and a second orientation using the second and fourth nominal orientations.

6. The virtual reality system of claim 1, further comprising one or more tactile devices configured to receive a touch signal from the controller, each tactile device configured to be worn on a hand or finger whereby vibration may be transmitted to a tip of a finger, wherein the controller is configured to generate the touch signals based on the first and second orientations.

7. The virtual reality system of claim 1, wherein:
the controller stores a model of a user's limb; and
the step of generating stimulation signals to simulate a force applied to the virtual hand comprises generating stimulation signals by applying the first and second orientations and the predefined mass to the model.

8. The virtual reality system of claim 1, wherein:
the determination means is further configured to produce output data representative of an orientation and/or velocity and/or acceleration of a hand of the user; and
the controller is further configured to receive output data from the determination means to determine a hand orientation of the hand of the user; and
the controller is configured to generate the stimulation signals based on the first, second and hand orientations.

9. The virtual reality system of claim 1, wherein:
the determination means is further configured to producing output data representative of an orientation, velocity and acceleration of a hand of the user; and
the controller is further configured to receive output data from the determination means to determine a hand orientation, hand velocity, and hand acceleration of the hand of the user; and
the controller is configured to generate the stimulation signals based on the first, second and hand orientations, the first, second and hand velocities and the first, second and hand accelerations.

10. A method for providing haptic feedback to a user, the method comprising the steps of:
defining a virtual environment with a controller;
representing a virtual object with a predefined mass in the virtual environment with the controller;
producing output data representative of an orientation and/or velocity and/or acceleration of an upper arm of the user and an orientation and/or velocity and/or acceleration of a lower arm of the user using determination means and thereby providing output data to the controller;
determining with the controller a first orientation of an upper arm of the user and a second orientation of a lower arm of the user;
representing a virtual hand of the user in the virtual environment using the defined first and second orientations;
generating stimulation signals with the controller to simulate a force applied to the virtual hand by the virtual object, wherein the controller is configured to generate the stimulation signals based on the first and second orientations; and
applying an electrical stimulus based on the stimulation signal to a muscle of a user based on a stimulation signal from the controller,
wherein the controller has a training mode in which it is configured to carry out the steps of:
receiving a plurality of electromyography data from one or more electrodes and thereby generating a plurality of target data points;
receiving training data for each target data point including data representative of a first orientation of an upper arm of the user, a second orientation of a lower arm of the user, and a mass held by the user; and
applying a machine learning algorithm to the training and target data to provide a prediction algorithm for predicting muscle activation from the orientation of the upper and lower arms and mass held, and
wherein the controller has a simulation mode in which the controller is configured to carry out the steps of:
defining a virtual environment;
representing a virtual hand of the user in the virtual environment;
representing a virtual object with a predefined mass in the virtual environment;
receiving electromyography data from one or more of the electrodes; and
predicting a muscle activation from the orientation of the upper and lower arms and predefined mass using the prediction algorithm; and
generating stimulation signals to simulate a force applied to the virtual hand, wherein the step comprises generating stimulation signals from the predicted muscle activation.

11. The method of claim 10, wherein:
the step of producing output data comprises producing output data representative of an orientation, velocity and acceleration of an upper arm of the user and an orientation, velocity and acceleration of a lower arm of the user using the determination means;
the step of determining with the controller comprises determining a first orientation, a first velocity and a first acceleration of an upper arm of the user and a second orientation, a second velocity and a second acceleration of a lower arm of the user;
the step of generating stimulation signals comprises generating the stimulation signals based on the first and second orientations, the first and second velocities and the first and second accelerations.

12. The method of claim 10, wherein:
the determination means comprises a set of sensor units for attachment to an arm of a human body, each sensor unit configured to produce output data representative of an orientation and/or acceleration of the sensor unit, each sensor in communication with the controller for providing sensor data to the controller; and
the controller is configured to receive sensor data from one or more of the sensor units for determining the first orientation of an upper arm of the user and the second orientation of a lower arm of the user.

13. The method of claim 10, wherein:
the determination means comprises a video camera in communication with the controller for providing video data to the controller; and
the step of determining with the controller comprises receiving video data from the video camera and applying a pose recognition algorithm to determine the first orientation of an upper arm of the user and the second orientation of a lower arm of the user.

14. The method of claim 10, wherein:
the determination means comprises a video camera in communication with the controller for providing video data to the controller;
the determination means further comprises a set of sensor units for attachment to an arm of a human body, each sensor unit configured to produce output data representative of an orientation and/or acceleration of the sensor unit, each sensor in communication with the controller for providing sensor data to the controller;
the controller is configured to receive sensor data from one or more of the sensor units to determine a first nominal orientation of an upper arm of the user and a second nominal orientation of a lower arm of the user;

the controller is configured to receive video data from the video camera and apply a pose recognition algorithm to determine a third nominal orientation of an upper arm of the user and a fourth nominal orientation of a lower arm of the user; and the controller is configured to determine a first orientation of an upper arm using the first and third nominal orientations and a second orientation using the second and fourth nominal orientations.

15. The method of claim 10, wherein:

the controller stores a model of a user's limb; and the step of generating stimulation signals to simulate a force applied to the virtual hand comprises generating stimulation signals by applying the first and second orientations and the predefined mass to the model.

16. The method of claim 10, further comprising:

producing output data representative of an orientation and/or velocity and/or acceleration of a hand of the user using the determination means; and receiving at the controller output data from the determination means to determine a hand orientation of the hand of the user, wherein the controller generates the stimulation signals based on the first, second and hand orientations.

17. The method of claim 10, further comprising:

producing output data representative of an orientation, velocity and acceleration of a hand of the user using the determination means; and receiving at the controller output data from the determination means and thereby determining a hand orientation, hand velocity, and hand acceleration of the hand of the user, wherein the controller generates the stimulation signals based on the first, second and hand orientations, the first, second and hand velocities and the first, second and hand accelerations.

* * * * *